United States Patent
Doppler et al.

(10) Patent No.: US 8,649,359 B2
(45) Date of Patent: Feb. 11, 2014

(54) APPARATUS AND METHOD FOR SELECTION OF A GATEWAY OF A LOCAL AREA NETWORK

(75) Inventors: Klaus Doppler, Espoo (FI); Sami J. Kekki, Helsinki (FI); Heikki Kokkinen, Helsinki (FI); Mika P. Rinne, Espoo (FI)

(73) Assignee: Nokia Corporation, Espoo (FI)

( * ) Notice: Subject to any disclaimer, the term of this patent is extended or adjusted under 35 U.S.C. 154(b) by 349 days.

(21) Appl. No.: 12/950,557

(22) Filed: Nov. 19, 2010

(65) Prior Publication Data

US 2012/0127974 A1    May 24, 2012

(51) Int. Cl.
     *H04W 4/00*          (2009.01)

(52) U.S. Cl.
     USPC ............ 370/338; 370/352; 370/401; 455/439

(58) Field of Classification Search
     USPC ......... 370/217–220, 252–253, 328–338, 352, 370/465–473, 401–427
     See application file for complete search history.

(56) References Cited

U.S. PATENT DOCUMENTS

| | | | | |
|---|---|---|---|---|
| 8,189,606 | B2 * | 5/2012 | Leroy et al. | 370/401 |
| 2007/0214232 | A1 | 9/2007 | Belimpasakis et al. | |
| 2010/0195621 | A1 * | 8/2010 | Kekki et al. | 370/332 |
| 2011/0103310 | A1 | 5/2011 | Stojanovski et al. | |
| 2012/0076121 | A1 * | 3/2012 | Choi et al. | 370/338 |

FOREIGN PATENT DOCUMENTS

| | | |
|---|---|---|
| EP | 2 091 285 A1 | 8/2009 |
| GB | 2 428 942 A | 2/2007 |
| WO | WO 2008/125729 A1 | 10/2008 |
| WO | WO 2010/062093 A2 | 6/2010 |

OTHER PUBLICATIONS

3GPP TS 22.220 v10.4.0 (Sep. 2010) Technical Specification; 3rd Generation Partnership Project; Technical Specification Group Services and System Aspects; Service Requirements for Home Node B (HNB) and Home eNode B (HeNB) (Release 10) (13.pgs.).

3GPP 23.829 v1.3.0 (Sep. 2010) Technical Report; 3rd Generation Partnership Project; Technical Specification Group Services and System Aspects; Local IP Access and Selected IP Traffic Offload (Release 10) (21 pgs.).

(Continued)

*Primary Examiner* — Ricky Ngo
*Assistant Examiner* — Iqbal Zaidi
(74) *Attorney, Agent, or Firm* — Alston & Bird LLP

(57) ABSTRACT

A provided apparatus is caused to direct establishment of a connection of the apparatus with a core network via a wide area radio access network (RAN), where the core network is coupled to an external network. The apparatus is also caused to select or receive selection of a local area network that is coupled to the same or different external network via one or more local gateways (L-GWs). The apparatus is caused to request selection of a L-GW of the one or more L-GWs from the core network via the wide area RAN, and in response, receive an identity of a selected L-GW. Further, the apparatus is caused to direct contact with the selected L-GW based on the identity, and establishment of a connection of the apparatus with the selected L-GW. The apparatus may thereby be connected to the external network via the local area network and selected L-GW.

27 Claims, 6 Drawing Sheets

(56) References Cited

OTHER PUBLICATIONS

3GPP TS 23.402 v10.1.0 (Sep. 2010) Technical Specification; $3^{rd}$ Generation Partnership Project; Technical Specification Group Services and System Aspects; Architecture Enhancements for Non-3GPP Accesses (Release 10) (113 pgs.).

International Search Report and Written Opinion for Application No. PCT/FI2011/0510047 dated Feb. 20, 2012.

\* cited by examiner

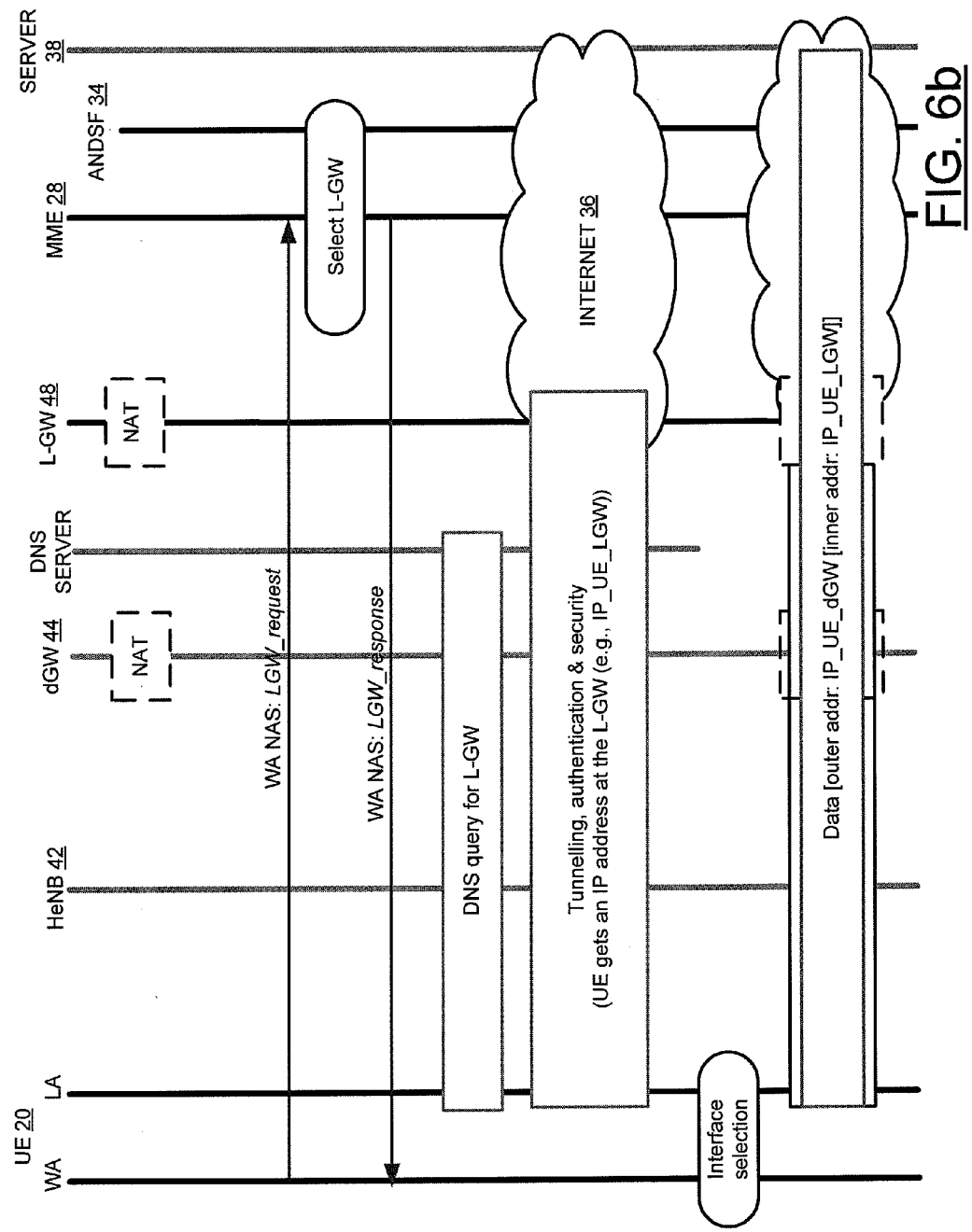

APPARATUS AND METHOD FOR SELECTION OF A GATEWAY OF A LOCAL AREA NETWORK

TECHNICAL FIELD

Example embodiments of the present invention generally relate to effectuating local area and wide area connectivity of a device with a mobile network to one or more external networks and, more particularly, relate to an apparatus and method for selecting or receiving selection of a gateway of a local area network for effectuating said local area connectivity.

BACKGROUND

The modern communications era has brought about a tremendous expansion of wireline and wireless networks. Various types of networking technologies have been developed resulting in an unprecedented expansion of computer networks, television networks, mobile communication networks, telephony networks, and the like, fueled by consumer demand. Beyond third generation (3G) wireless systems (B3G) and 4G mobile communication systems are considered to be heterogeneous networks that include multiple radio access technologies (RATs), which may be implemented by corresponding radio access networks (RANs). Examples of such multi-RAT environments include 2G (e.g., GPRS, EDGE), 3G (e.g., UMTS, W-CDMA), 3G transitional (e.g., HSDPA, HSUPA, LTE) or 4G (e.g., IMT-A, LTE-A) networks, a 3G/2G environment or even a cellular/WLAN environment.

Wide area RANs generally provide user equipment with wide area access to the core networks of public land mobile networks (PLMNs), and to other external networks such as the Internet via a respective core network. Another type of network, referred to as a local access network, generally provides user equipment with access to these and other external networks either going through or without going through (bypassing) the core network. Access to the external network without going through the core network may be referred to as a local breakout. The term heterogeneous network is often used to describe wireless networks using different access technologies. In this regard, a wireless heterogeneous network may, for example, provide a service through a wireless local area network (WLAN) and switch to a cellular network while maintaining the service.

BRIEF SUMMARY

According to one aspect of example embodiments of the present invention, an apparatus is provided that includes at least one processor and at least one memory including computer program code, where the memory and the computer program code are configured to, with the processor, cause the apparatus to at least perform a number of operations. In this regard, the apparatus is caused to direct establishment of a connection of the apparatus with a core network via a wide area radio access network, where the core network is coupled to a first external network. The apparatus is also caused to select or receive selection of a local area network that is distinct from the wide area radio access network, and that is coupled to a second external network via one or more local gateways. The second external network may be the same or different from the first external network.

The apparatus is caused to receive an identity of a selected local gateway from the core network, direct contact with the selected local gateway based on the identity, and establishment of a connection of the apparatus with the selected local gateway. In one example, the connection may be established as a tunnel, and in such instances, the apparatus and selected gateway may be the endpoints of the tunnel. The apparatus may thereby be connected to the second external network via the local area network and selected local gateway. More particularly, for example, the apparatus may have a concurrent connection with the first external network via the wide area radio access network and with the second external network via the local area network after establishment of the connection of the apparatus with the selected local gateway.

In one example, the apparatus being caused to receive the identity of a selected local gateway includes the apparatus being caused to prepare for transmission from the apparatus to the core network via the wide area radio access network, a request for selection of a local gateway of the one or more local gateways via which the local area network is coupled to the second external network. In this example, the apparatus may also be caused to receive an identity of a selected local gateway of the one or more local gateways from the core network in response to the request.

In another example, apparatus being caused to receive the identity of a selected local gateway includes the apparatus being caused to receive from the core network a list identifying one or more possible local gateways and instructions on how to select a local gateway from the list. In this example, the apparatus may also be caused to select a local gateway from the list in accordance with the instructions. Also in this example, the apparatus may be further caused to prepare for transmission to the core network via the wide area radio access network, a request for approval of the selected local gateway; and in response to the request, receive a response from the core network accepting or rejecting the selected local gateway.

The apparatus may be further caused to selectively communicate with the first external network via the wide area radio access network, and the second external network via the local area network, according to one or more offload policies loaded by the core network into the selected local gateway. This selective communication may occur concurrently with the apparatus having respective interfaces to the wide are radio access network and local area network open at the same time. Directing traffic to the interfaces may then be decided in a number of different manners, such as on a per-flow or per-flow-type basis, or in accordance with the aforementioned offload policies.

According to another aspect of example embodiments of the present invention, an apparatus is provided that similarly includes at least one processor and at least one memory including computer program code, where the memory and the computer program code are configured to, with the processor, cause the apparatus to at least perform a number of operations. According to this aspect, the apparatus is caused to prepare an identity of a selected local gateway for transmission to user equipment, the identity of the selected local gateway being prepared for transmission from the apparatus as part of a core network with which a user equipment is connected via a wide area radio access network, where the core network is coupled to a first external network. The user equipment is configured to select or receive selection of a local area network that is distinct from the wide area radio access network, and that is coupled to a second external network via one or more local gateways (the second external network being the same or different from the first external network). The user equipment, then, may be configured to contact the selected local gateway based on the identity, and establish a connection with the selected local gateway. The user equipment may thereby be connected to the second external network via the local area network and selected local gateway.

In one example, the apparatus may be configured to receive a request for selection of a local gateway of the one or more local gateways via which the local area network is coupled to the second external network. In such instances, the apparatus may also be caused to select a local gateway of the one or more local gateways, such as based on one or more of a subscription of the UE's user with the PLMN operator (determined based on an identity of the user equipment), a location, context information and/or presence definitions of the user equipment, quality of service (QoS) and/or service profiles, or an identity of the selected local area network. The apparatus may then be caused to prepare an identity of the selected local gateway for transmission to the user equipment.

In another example, the apparatus being caused to prepare an identity of a selected local gateway for transmission includes being configured to cause the apparatus to prepare for transmission, a list identifying one or more possible local gateways and instructions on how to select a local gateway from the list. In this example, the user equipment may be configured to select a local gateway from the list in accordance with the instructions. Also in this example, the apparatus may be further caused to receive from the user equipment via the wide area radio access network, a request for approval of the selected local gateway; and in response to the request, prepare a response for transmission to the user equipment accepting or rejecting the selected local gateway.

The apparatus may be further caused to prepare one or more offload and connectivity policies (including, e.g., security modes and settings) for transmission from the core network to at least one of the one or more local gateways to thereby load the respective policies into the respective at least one of the one or more local gateways. The user equipment connection with the selected gateway may therefore be effectuated in accordance with the offload and connectivity policies (possibly including security modes and settings).

BRIEF DESCRIPTION OF THE DRAWING(S)

Having thus described the invention in general terms, reference will now be made to the accompanying drawings, which are not necessarily drawn to scale, and wherein:

Figure 1:
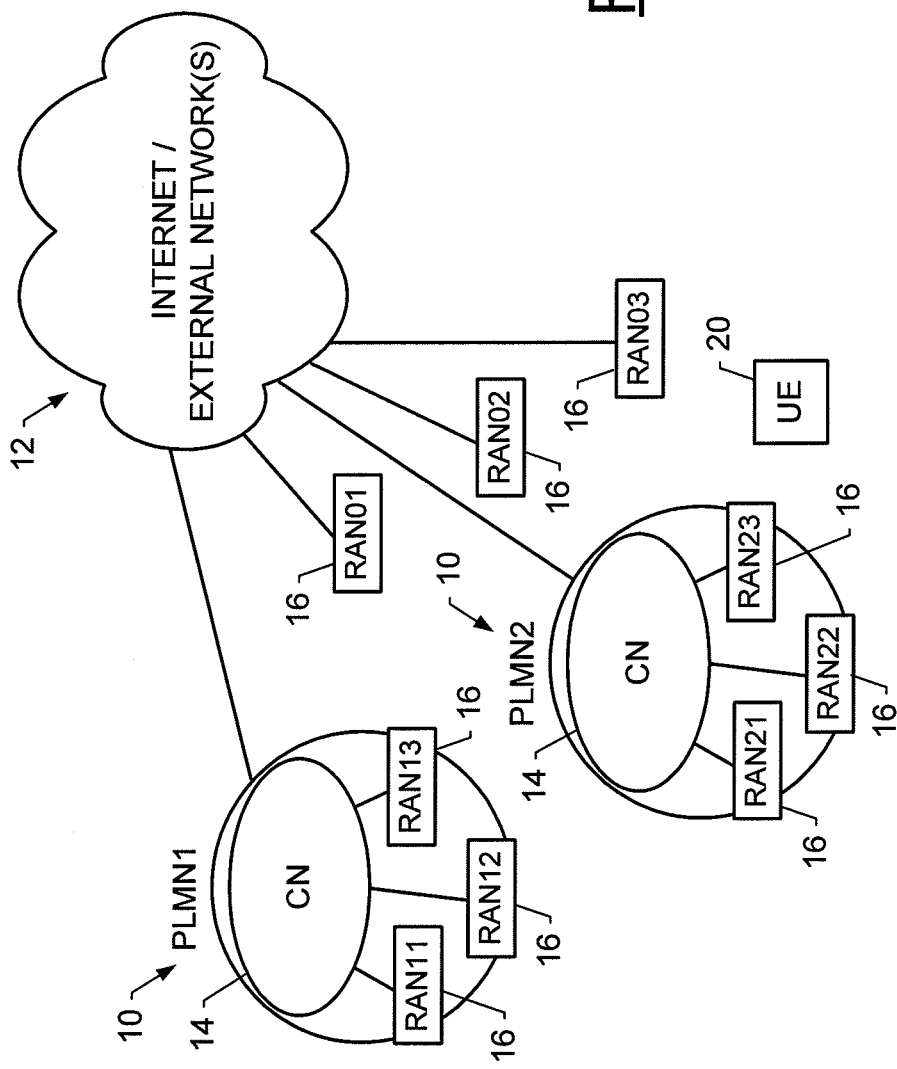
FIG. 1 illustrates a communication system according to various example embodiments of the present invention.
Figure 3:
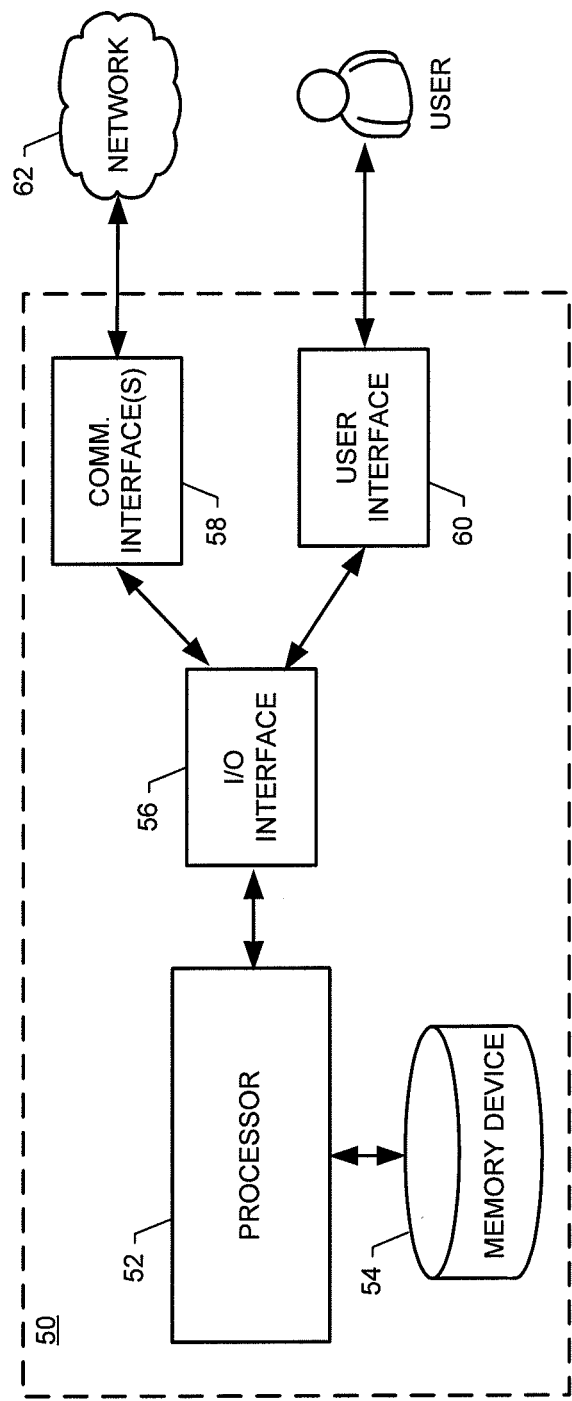
Figure 4:
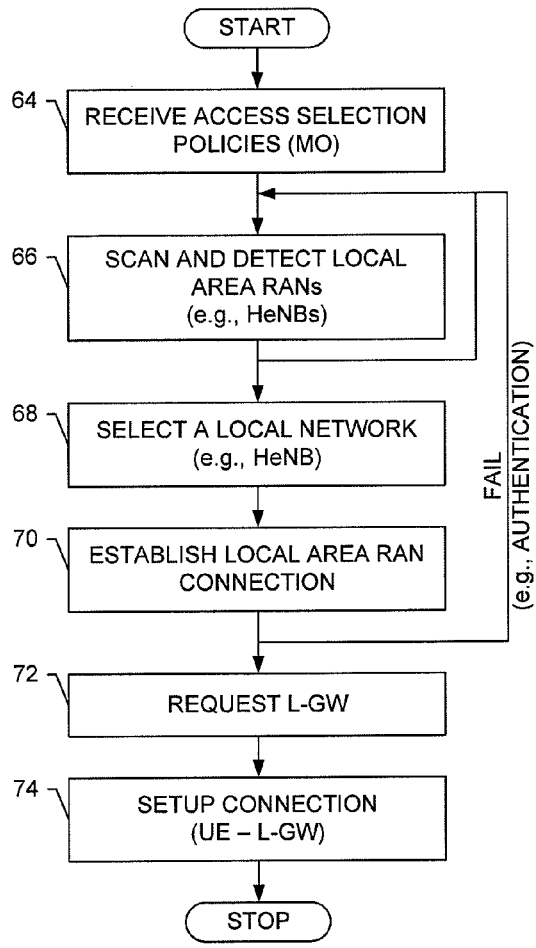
Figure 5:
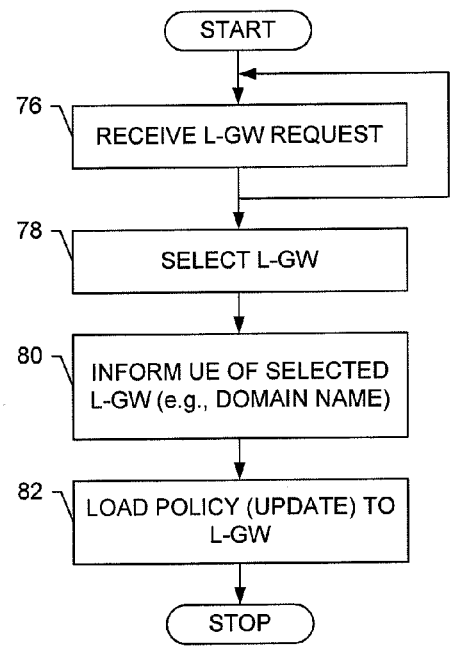
Figure 6A:
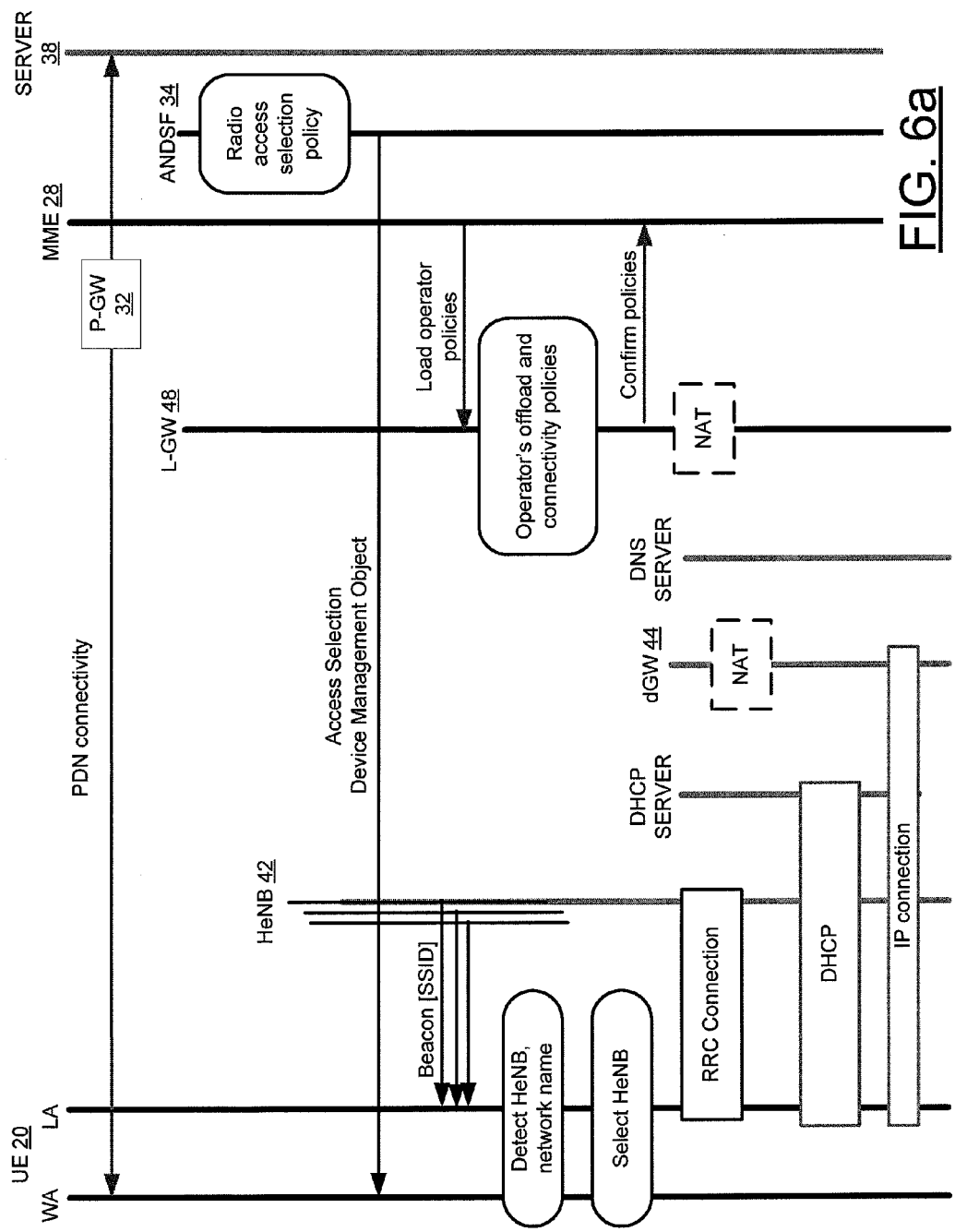

FIG. 3 illustrates an apparatus that may be configured to operate within the system of FIG. 1, according to various example embodiments of the present invention; and FIGS. 4 and 5 are flowcharts including various operations in methods according to various example embodiments of the present invention; and FIGS. 6a and 6b are collectively a control flow diagram including various operations in a method according to various example embodiments of the present invention.

DETAILED DESCRIPTION

Example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout. Reference may be made herein to terms specific to a particular system, architecture or the like, but it should be understood that example embodiments of the present invention may be equally applicable to other similar systems, architectures or the like. For example, reference may be made to the 3GPP entities; however, it should be understood that example embodiments of the present invention may be equally applicable to other mechanisms for controlling network discovery and selection, including both 3GPP and non-3GPP technologies and mechanisms.

The terms "data," "content," "information," and similar terms may be used interchangeably, according to some example embodiments of the present invention, to refer to data capable of being transmitted, received, operated on, and/or stored. The term "network" may refer to a group of interconnected computers, clients, servers or other computing devices. Within a network, these computers or other computing devices may be interconnected directly or indirectly by various means including via one or more switches, routers, gateways, access points or the like.

Further, as used herein, the term "circuitry" refers to any or all of the following: (a) hardware-only circuit implementations (such as implementations in only analog and/or digital circuitry); (b) to combinations of circuits and software (and/or firmware), such as (as applicable): (i) a combination of processor(s) or (ii) portions of processor(s)/software (including digital signal processor(s)), software and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Further, as described herein, various messages or other communication may be transmitted or otherwise sent from one element or apparatus to another element or apparatus. It should be understood that transmitting a message or other communication may include not only transmission of the message or other communication, but may also include preparation of the message or other communication by a transmitting apparatus or various means of the transmitting apparatus.

FIG. 1 depicts a communications system according to various example embodiments of the present invention. As shown, the system includes one or more public land mobile network (PLMNs) 10 coupled to one or more other external networks 12—notably including a wide area network (WAN) such as the Internet. Each of the PLMNs includes a core network (CN) 14 backbone such as the Evolved Packet Core (EPC) of the Evolved Packet System (EPS); and each of the core networks and the Internet are coupled to one or more radio access networks (RANs) 16, air interfaces or the like that implement one or more radio access technologies (RATs).

In addition, the system includes one or more mobile radio units that may be varyingly known as user equipment (UE) 20, terminal equipment, mobile station or the like. As a mobile terminal, the UE may be a mobile computer, mobile phone, a communicator, a tablet, a portable digital assistant (PDA), a pager, a mobile television, a gaming device, a mobile computer, a laptop computer, a camera, a video recorder, an audio/video player, a radio, and/or a global positioning system (GPS) device, any combination of the aforementioned, or the like. In operation, these UEs may be configured to connect to one or more of the RANs 16 according to their particular RATs to thereby access a particular core network of a PLMN 10, or to access one or more of the external networks 12 (e.g., the Internet). In various instances, a single UE, a dual-mode or multimode UE, may support multiple (two or more) RANs—thereby being configured to connect to multiple RANs. For example, a particular UE may support both GSM and UMTS radio access technologies.

Examples of radio access technologies include 3GPP radio access, 3GPP2 radio access (e.g., CDMA 2000 radio access), Wireless Local Area Networks (WLANs) such as IEEE 802.xx networks (e.g., 802.11a, 802.11b, 802.11g, 802.11n, etc.), world interoperability for microwave access (WiMAX) networks, IEEE 802.16, and/or wireless Personal Area Networks (WPANs) such as IEEE 802.15, Bluetooth, low power versions of Bluetooth, ultra wideband (UWB), Wibree, Zigbee or the like. Examples of 3GPP radio access technologies include 2G, 3G (also known as International Mobile Telecommunications-2000 or IMT-2000), 3.5G, 3.9G or 4G (IMT-Advanced or IMT-A) technologies such as Global System for Mobile Communications (GSM), General Packet Radio Service (GPRS), Enhanced Data rates for GSM Evolution (EDGE), UMTS radio access UTRAN (Universal Terrestrial Radio Access Network), Wideband Code Division Multiple Access (W-CDMA), High-Speed Packet Access (HSPA) including High-Speed Downlink Packet Access (HSDPA) and/or High-Speed Uplink Packet Access (HSUPA), UTRAN Long Term Evolution (LTE), Super 3G or E-UTRAN (Evolved UTRAN), LTE-Advanced (LTE-A), IMT-Advanced (International Mobile Telecommunications Advanced—IMT-A) or the like. Generally, a radio access technology may refer to any 2G, 3G, 4G or higher generation mobile communication technology and their different versions, as well as to any other wireless radio access technology that may be arranged to interwork with such a mobile communication technology to provide access to an operator's core network.

A RAN 16 may generally include some type of network controlling/governing entity, such as a radio network controller in UTRAN or base station controller in GSM, which may be responsible for control of one or more base stations (BSs) that are configured to interact with UEs 20. In various instances, a BS may be referred to as a base station, access point (AP), base transceiver station (BTS), Node B (NB), evolved NB (eNB), macro BS, NB (MNB) or eNB (MeNB), home BS, NB (HNB) or eNB (HeNB), or the like. As used herein, a network controlling/governing entity and BS may be separate or integrated into a single apparatus. The network controlling/governing entity may include a controller, processor or the like programmed to carry out various management functions, etc. The controller may be associated with a memory or database for maintaining information required in the management functions. The network controlling/governing entity may include one or more switch units for switching connection between network elements within the RAN. The switch units may include, for example, one or more Ethernet, Gigabit Ethernet or Asynchronous Transfer Mode (ATM) switches, and/or any other layer-2 transport and switching network, possibly including radio links. The network controlling/governing entity may be connected to a Circuit Switched Core Network through, e.g., Media Gateway (MGW) and to a Packet Switched Core Network through, e.g., one or more of a Serving GPRS Support Node (SGSN), packet data network (PDN) gateway (P-GW) or serving gateway (S-GW).

Figure 2:
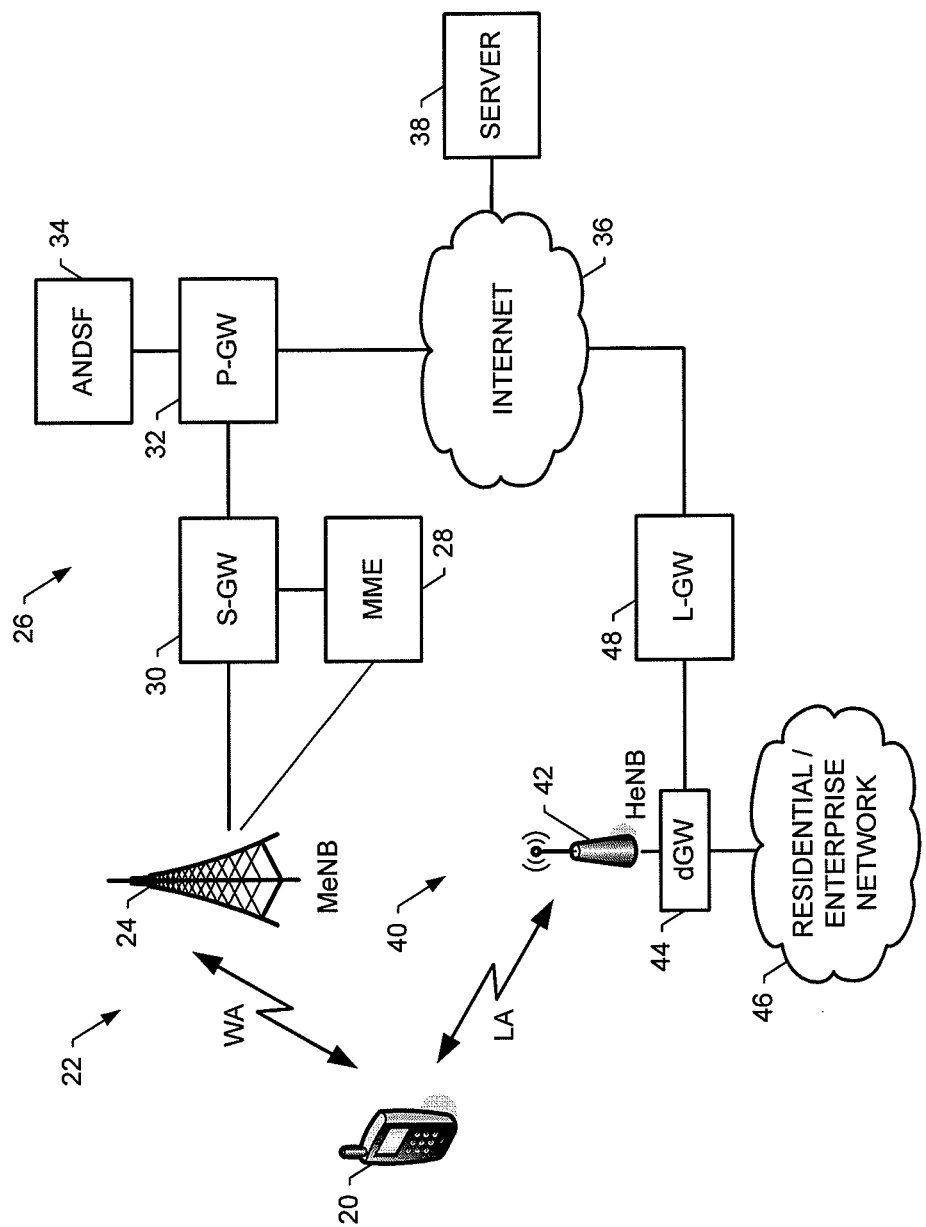
FIG. 2 illustrates various elements of the system of FIG. 1, arranged according to various example embodiments of the present invention.

FIG. 2 more particularly depicts various elements of the networks shown in FIG. 1, according to various example embodiments of the present invention. The system includes a wide area RAN 22, which in various instances may be configured as one or more macrocells, microcells, picocells, femtocells or the like. The wide area RAN may include one or more BSs which, in one example, may be referred to as MeNBs 24. The wide area RAN may be coupled to a core network 26 of a mobile network operator (MNO) via one or more defined interfaces, such as a S1-interface, an Iu-interface or the like. The core network may include, for example, a mobility management entity (MME) 28, S-GW 30, P-GW 32, access network discovery and selection function (ANDSF) 34 or the like.

The MME 28 and S-GW 30 may be separate or integrated into a single apparatus and perform control-plane functionality and bearer-plane functionality, respectively, for the core network 26. The MME in the MNO's core network may be a control node of the UE 20, and may be responsible for managing, for example, mobility, temporary UE identities and security parameters and paging procedure including retransmissions. The MME may also be involved in the bearer activation/deactivation process, and may be also responsible for selecting a S-GW and/or P-GW 32 for the UE 20. The MME includes further functions and protocols such as Non Access Stratum (NAS) signaling and security procedures, and may further check the authorization of the UE to camp on the service provider's PLMN and/or enforce UE roaming restrictions. The MME may also provide the control plane function for mobility between different RATs (e.g., LTE and 2G/3G).

The S-GW 30 may be responsible for routing and forwarding user data to and from UEs 20, and may also serve as a user-plane anchor during inter-BS handovers and as the anchor for mobility between different RATs (e.g., LTE and 2G/3G).

The P-GW 32 may provide the UE 20 with connectivity to external networks such as the Internet 36 by being the point of exit and entry of traffic for the UE. By the external network(s), the UE may communicate with one or more apparatus such as servers 38 coupled to the respective network(s). It should be understood, however, that other types of connections are possible, such as in the context of peer-to-peer networking, ad-hoc networking or the like where the UE may serve as a host, client or both host and client. The P-GW may also perform policy enforcement, packet filtering for each user, charging support, packet screening and the like. And the P-GW may function as an anchor for mobility between different RATs (e.g., 3GPP and non-3GPP).

The P-GW 32 may also manage and store contexts for UE data sessions with an external network such as the Internet 36 via the core network 26 and wide area RAN 22. A UE context in this instance may be or include data structures present in a Packet Data Protocol (PDP) context with information regarding the UE's active session. This information may include, for example, routing information and one or more policies and/or preferences such as for charging, user priorities, subscription weights or limits, traffic quality of service (QoS) priorities, traffic shaping policies or the like.

The ANDSF 34 may be implemented by a server or other apparatus, and may provide the UE 20 with access network discovery information and inter-system mobility policies for the core network 26 within which the ANDSF is located. The ANDSF may implement device management functionality to configure a UE or assist a UE with radio access detection and selection. In accordance with DM, the ANDSF may set parameters of the UE via the use of a managed object (MO) that organizes parameters related to policy, discovery information and UE location in a collection of nodes.

In addition to the wide area RAN 22 and core network 26, the UE 20 may be coupled to a local area network 40, and may connect via these networks to one or more external networks such as the Internet 36 or a private network such as an Intranet, Extranet or the like (or, e.g., to the Internet via a private network). The local area network may be configured as a local area RAN arranged to interwork with other RANs to provide access to a core network, such as in the context of a WLAN configured to access the core network via a WLAN access gateway (WAG). Additionally or alternatively, the local area network may be arranged to provide access to one or more external networks independent of an operator's core network, such as in the context of a WLAN configured to access external network(s) independent of the core network. The local area network generally permits the UE to connect to an external network either through or without going through (bypassing) the core network, where access to the external network without going through the core network may be referred to as a local breakout. The wide area RAN, on the other hand, permits the UE to connect to an external network, but requires the connection to pass through the core network.

The local area network 40 may include one or more BSs which, in one example, may be referred to as HeNBs 42. The local area network may have a geographic area of coverage at least partially overlapped by the wide area RAN, and may operate at least partially within the geographic area of the wide area RAN. The local area network, however, may be better suited than the wide area RAN in various environments such as indoors as part of a residential or enterprise network. In this regard, the local area network may also include a default gateway (dGW) 44, such as a HeNB gateway, that serves to couple the HeNB to an external network such as a residential/enterprise network 46, and a local gateway (L-GW) 48 that serves to couple the HeNB to an external network such as the Internet 36. As indicated above, access to these external networks bypassing the core network 26 may be referred to as a local breakout. This local breakout may occur, for example, using 3GPP technologies suited for the local area access or using non-3GPP technologies such as WLAN. It is notable that in a local breakout scheme, the local access by either technology (3GPP or non-3GPP) may replace registration to the operator's visited PLMN (VPLMN). Yet, according to example embodiments of the present invention invention, the access may at least partly be controlled by the operator, as explained below.

Resources between the wide area and local area networks may be shared in a number of different manners, such as by dividing the operation of the respective networks to different frequencies or frequency bands, either under spectrum licensing rules or as unlicensed to license-exempt bands. In various instances, dividing the operation of wide area and local area networks to different frequencies may employ frequencies in the same frequency band, such as by using different carrier frequencies selected by a deployment plan or by network auto-configuration programs. Some access nodes may also mutually operate on the same frequencies (co-channel operation), such as when the power (interference) conditions or operation modes allow this kind of operation.

Reference is now made to FIG. 3, which illustrates an apparatus 50 that may be configured to function as one or more elements of the systems of FIGS. 1 and 2 to perform example methods of the present invention. These elements may include, for example, the UE 20, MeNB 24, MME 28, S-GW 30, P-GW 32, ANDSF 34, server 38, HeNB 42, dGW 44 and/or L-GW 48. Although shown as separate elements, in some example embodiments, an apparatus may support more than one element, logically separated but co-located within the apparatus. For example, a single apparatus may support a logically separate, but co-located, HeNB, dGW and/or L-GW. Also, for example, a single apparatus may support a logically separate, but co-located, S-GW and MME.

In some example embodiments, the apparatus 50 may, be embodied as, or included as an element of, a communications device with wired or wireless communications capabilities. The example apparatus may include or otherwise be in communication with one or more processors 52, memory devices 54, Input/Output (I/O) interfaces 56, communications interfaces 58 and/or user interfaces 60 (one of each being shown). Depending on the element of FIG. 1 being implemented by the apparatus, however, the apparatus may include additional elements and/or may not include one or more of the foregoing elements, such as the user interfaces.

The processor 52 may be embodied as various means for implementing the various functionalities of example embodiments of the present invention including, for example, one or more of a microprocessor, a coprocessor, a controller, a special-purpose integrated circuit such as, for example, an ASIC (application specific integrated circuit), an FPGA (field programmable gate array), DSP (digital signal processor), or a hardware accelerator, processing circuitry or other similar hardware. According to one example embodiment, the processor may be representative of a plurality of processors, or one or more multi-core processors, operating individually or in concert. A multi-core processor enables multiprocessing within a single physical package. Examples of a multi-core processor include two, four, eight, or greater numbers of processing cores. Further, the processor may be comprised of a plurality of transistors, logic gates, a clock (for example, oscillator), other circuitry, and the like to facilitate performance of the functionality described herein. The processor may, but need not, include one or more accompanying digital signal processors (DSPs). A DSP may, for example, be configured to process real-world signals in real time independent of the processor. Similarly, an accompanying ASIC may, for example, be configured to perform specialized functions not easily performed by a more general purpose processor. In some example embodiments, the processor is configured to execute instructions stored in the memory device or instructions otherwise accessible to the processor. The processor may be configured to operate such that the processor causes the apparatus to perform various functionalities described herein.

Whether configured as hardware alone or via instructions stored on a computer-readable storage medium, or by a combination thereof, the processor 52 may be an apparatus configured to perform operations according to embodiments of the present invention while configured accordingly. Thus, in example embodiments where the processor is embodied as, or is part of, an ASIC, FPGA, or the like, the processor is specifically configured hardware for conducting the operations described herein. Alternatively, in example embodiments where the processor is embodied as an executor of instructions stored on a computer-readable storage medium, the instructions specifically configure the processor to perform the algorithms and operations described herein. In some example embodiments, the processor is a processor of a specific device configured for employing example embodiments of the present invention by further configuration of the processor via executed instructions for performing the algorithms, methods, and operations described herein.

The memory device 54 may be one or more computer-readable storage media that may include volatile and/or non-volatile memory. In some example embodiments, the memory device may include Random Access Memory (RAM) including dynamic and/or static RAM, on-chip or off-chip cache memory, and/or the like. Further, the memory device may include non-volatile memory, which may be embedded and/or removable, and may include, for example, Read-Only Memory (ROM), flash memory, magnetic storage devices (for example, hard disks, floppy disk drives, magnetic tape, etc.), optical disc drives and/or media, non-volatile random access memory (NVRAM), and/or the like. The memory device may include a cache area for temporary storage of data. In this regard, at least a portion or the entire memory device may be included within the processor 52.

Further, the memory device 54 may be configured to store information, data, applications, computer-readable program code instructions, and/or the like for enabling the processor 52 and the example apparatus 50 to carry out various functions in accordance with example embodiments of the present invention described herein. For example, the memory device may be configured to buffer input data for processing by the processor. Additionally, or alternatively, the memory device may be configured to store instructions for execution by the processor. The memory may be securely protected, with the integrity of the data stored therein being ensured. In this regard, data access may be checked with authentication and authorized based on access control policies.

The I/O interface 56 may be any device, circuitry, or means embodied in hardware, software or a combination of hardware and software that is configured to interface the processor 52 with other circuitry or devices, such as the communications interface 58 and/or the user interface 60. In some example embodiments, the processor may interface with the memory device via the I/O interface. The I/O interface may be configured to convert signals and data into a form that may be interpreted by the processor. The I/O interface may also perform buffering of inputs and outputs to support the operation of the processor. According to some example embodiments, the processor and the I/O interface may be combined onto a single chip or integrated circuit configured to perform, or cause the apparatus 50 to perform, various functionalities of an example embodiment of the present invention.

The communication interface 58 may be any device or means embodied in hardware, software or a combination of hardware and software that is configured to receive and/or transmit data from/to one or more networks 62 and/or any other device or module in communication with the example apparatus 50. The processor 52 may also be configured to facilitate communications via the communications interface by, for example, controlling hardware included within the communications interface. In this regard, the communication interface may include, for example, one or more antennas, a transmitter, a receiver, a transceiver and/or supporting hardware, including, for example, a processor for enabling communications. Via the communication interface, the example apparatus may communicate with various other network elements in a device-to-device fashion and/or via indirect communications.

The communications interface 58 may be configured to provide for communications in accordance with any of a number of wired or wireless communication standards. The communications interface may be configured to support communications in multiple antenna environments, such as multiple input multiple output (MIMO) environments. Further, the communications interface may be configured to support orthogonal frequency division multiplexed (OFDM) signaling. In some example embodiments, the communications interface may be configured to communicate in accordance with various techniques including, as explained above, any of a number of 2G, 3G, 4G or higher generation mobile communication technology and their different versions, radio frequency (RF), infrared data association (IrDA) or any of a number of different wireless networking techniques. The communications interface may also be configured to support communications at the network layer, possibly via Internet Protocol (IP).

The user interface 60 may be in communication with the processor 52 to receive user input via the user interface and/or to present output to a user as, for example, audible, visual, mechanical or other output indications. The user interface may include, for example, a keyboard, a mouse, a joystick, a display (for example, a touch screen display), a microphone, a speaker, or other input/output mechanisms. Further, the processor may comprise, or be in communication with, user interface circuitry configured to control at least some functions of one or more elements of the user interface. The processor and/or user interface circuitry may be configured to control one or more functions of one or more elements of the user interface through computer program instructions (for example, software, firmware, middleware, embedded software and/or higher abstractions of software such as scripts or markup languages) stored on a memory accessible to the processor (for example, the memory device 54). In some example embodiments, the user interface circuitry is configured to facilitate user control of at least some functions of the apparatus 50 through the use of a display and configured to respond to user inputs. The processor may also comprise, or be in communication with, display circuitry configured to display at least a portion of a user interface, the display and the display circuitry configured to facilitate user control of at least some functions of the apparatus.

In some cases, the apparatus 50 of example embodiments may be implemented on a chip or chip set. In an example embodiment, the chip or chip set may be programmed to perform one or more operations of one or more methods as described herein and may include, for instance, one or more processors 52, memory devices 54, I/O interfaces 56 and/or other circuitry components incorporated in one or more physical packages (for example, chips). By way of example, a physical package may include an arrangement of one or more materials, components, and/or wires on a structural assembly (for example, a baseboard) to provide one or more characteristics such as physical strength, conservation of size, and/or limitation of electrical interaction. It is contemplated that in certain embodiments the chip or chip set can be implemented in a single chip. It is further contemplated that in certain embodiments the chip or chip set can be implemented as a single "system on a chip." It is further contemplated that in certain embodiments a separate ASIC may not be used, for example, and that all relevant operations as disclosed herein may be performed by a processor or processors. A chip or chip set, or a portion thereof, may constitute a means for performing one or more operations of one or more methods as described herein.

In one example embodiment, the chip or chip set includes a communication mechanism, such as a bus, for passing information among the components of the chip or chip set. In accordance with one example embodiment, the processor 52 has connectivity to the bus to execute instructions and process information stored in, for example, the memory device 54. In instances in which the apparatus 50 includes multiple processors, the processors may be configured to operate in tandem via the bus to enable independent execution of instructions, pipelining, and multithreading. In one example embodiment, the chip or chip set may include one or more processors and software and/or firmware supporting and/or relating to and/or for the one or more processors.

As explained above, a UE 20 may be capable of establishing wide area (WA) connectivity via the wide area RAN 22, and may be capable of establishing local area (LA) connectivity via the local area network 40. Through these connections, the UE may be configured to access the core network 26 and/or one or more external networks such as the Internet 36, residential/enterprise network 46 or the like. According to example embodiments, the UE 20 may include an interface management function configured to concurrently manage a wide area RAN interface and local area network interface in a manner that coordinates their use and follows preferences of the PLMN operator. These preferences may be set by the operator in the form of offload policies, such as through the MME 28, and loaded into the L-GW 48 via which the UE accesses the external network(s). The offload policies and respective settings at the L-GW may be referred to as UE local context in the L-GW. The acting offload policies in the UE may impact the selection of the interface to use. The UE may, for example, selectively offload traffic flowing through the wide area RAN to instead flow through the local area network, and vice versa, according to the operator's offload policies. In this regard, offload may refer to initiating and/or transferring the mapping of traffic flows from one interface to another interface. The manner and/or conditions by which the mapping is initiated or transferred, to which interfaces which flows are transferred may be defined by the UE or by the aforementioned offload policies in the UE, or in the L-GW respectively.

As also explained above, the MME 28 may be configured to select a S-GW 30 and/or P-GW 32 for a UE 20 accessing an external network such as the Internet 36 via the core network 26 and wide area RAN 22. In accordance with example embodiments of the present invention, the MME may include a gateway selection function configured to select a L-GW 48 for a UE accessing the same or another external network via the local area network 40, through or without going through (bypassing) the core network. In particular, the L-GW may be selected to operate concurrently with the P-GW 32. The procedures involving the P-GW or S-GW 30 remain intact by the actions in the local area network and its L-GW. The MME may be further configured to setup or otherwise load offload and connectivity policies of the PLMN operator into the selected L-GW, either before, as or after its selection for the particular UE. The MME may load the offload and connectivity policies into the selected L-GW through or without going through a UE. In one example, these offload and connectivity policies may be similar to but more elaborate than those of the UE contexts managed and stored by the P-GW. The offload and connectivity policies may include, for example, policies related to the user's subscribed priority, flow or server-based connectivity preferences, QoS classes, traffic priorities, traffic shaping parameters, charging, charging principles and mechanisms or the like. Additionally or alternatively, for example, the offload and connectivity policies may include security modes and settings.

As described herein, functions of the core network 26 according to example embodiments may be performed by the MME 28 or ANDSF 34. It should be understood, however, that one or more functions described as being performed by the MME may instead be performed by another element of the core network, such as the S-GW 30, P-GW 32, ANDSF, network server or the like. Similarly, one or more functions described as being performed by the ANDSF may instead be performed by another component of the core network, such as the S-GW, P-GW, MME or the like. Thus, functions described herein as being performed by a component of the core network may more generally be considered functions performed by the core network.

FIG. 4 is a flowchart illustrating various operations in a method that may be performed by various means of a UE 20, such as by the various means of the apparatus 50 of FIG. 3 configured to operate as a UE, in accordance with example embodiments of the present invention. Consider instances in which the UE 20 is served by a wide area RAN 22 and has located a HeNB 42 of a local area network 40, and in which the UE may (but need not) have also established a connection with the dGW 44 of the local area network. In these instances, as shown at block 64, the method may include means such as the processor 52, I/O interface 56 and/or communication interface 58*b* for receiving access selection policies of the PLMN operator The access selection policies may relate to selecting a BS (e.g., HeNB) based on radio measurements, location, policies or the like, accessing the network including the BS via the selected BS (if permitted), and establishing a radio resource control (RRC) connection to the respective network. These access selection policies may be received from the core network in any of a number of different manners. In one example, the access selection policies may be received from the ANDSF 34 such as in or concurrent with a MO for the UE.

As shown in block 66, the method may include means such as the processor 52, I/O interface 56 and/or communication interface 58*b* for the UE scanning and detecting local area networks 40, or more particularly for example, HeNBs 42 of local area networks. The method may then include means such as the processor for selecting (or receiving selection of) a detected local area network, and establishing a connection to the selected local area network, such as in accordance with the operator's access selection policies, as shown in blocks 68 and 70. This may include the UE 20 authenticating with the local area network; and in instances in which the UE fails to authenticate or otherwise connect to the selected local area network, the UE may scan and detect another local area network with which to connect.

After selecting a local area network 40, and before, as or after establishing a connection with the respective local area network, the method may include means such as the processor 52, I/O interface 56 and/or communication interface 58*b* for preparing for transmission, and transmitting, a request from the UE 20 to the operator's core network 26 for selection of a L-GW 48, as shown in block 72. The request may be prepared for transmission and transmitted, for example, by the UE to the core network via the wide area RAN 22. In one particular example, the request may be in the form of a message (e.g., LGW_request) requesting the domain name or IP address of a L-GW with which the UE may establish connectivity. This request message may include, for example, the identity and/or location of the UE. The identity of the UE may be expressed, for example, as a Mobile Station International Subscriber Directory Number (MSISDN), International Mobile Subscriber Identity (IMSI) or any of its temporary Mobile Subscriber Identities (e.g., T-IMSI, P-IMSI, S-IMSI), International Mobile Equipment Identity (IMEI), or private IP address, IP address or domain name (e.g., Domain Name System—DNS—name) of the UE in the local area network (e.g., domain name of the UE in the domain of the dGW of the local area network), a Uniform Resource Identifier (URI), Uniform Resource Name (URN), Uniform Resource Locator (URL) or the like. Such a domain name may be, for example, particularly useful for a mobile Web server. The location of the UE may be expressed, for example, as geographical coordinates, identifier of a cell of the wide area RAN, World Wide Web Consortium (W3C) location application programming interface (API) description, or other navigational information such as a name and/or address of a structure within which the local area network is situated.

In addition to the identity and/or location of the UE 20, the request message from the UE may also include the identity—e.g., service set identifier (SSID)—of the local area network 40, and if known, the identity of the HeNB 42 of the local area network with which the UE has established a connection. Further, for example, the request message may include a description or other indication of a cause for the UE requesting selection of a L-GW 48.

In response to the request, the method may include means such as the processor 52, I/O interface 56 and/or communication interface 58*b* for receiving a message (e.g., LGW_response) at the UE 20 from the core network 26 including the identity of a L-GW 48 selected by the core network, or more particularly for example, the MME 28 of the core network. This identity may be expressed, for example, as the domain name (e.g., DNS name), IP address or other numerical identity of the respective L-GW. The IP address to identify the L-GW may be a permanent IP address of the interface of the L-GW, where the L-GW may be configured to receive Dynamic Host Configuration Protocol (DHCP) requests. In addition to the identity of the L-GW, the response message may also include other information regarding the L-GW. This other information may include whether the local area network 40 via which the UE connects to the L-GW is a preferred network (e.g., a trusted or untrusted network), and/or local network security configuration information for the L-GW.

After receiving the response message, the method may include means such as the processor 52, I/O interface 56 and/or communication interface 58*b* for directing contact with the selected L-GW 48 based on its identity, and establishment of a connection with the respective L-GW, as shown in block 74. The UE 20 may thus have concurrent wide area connectivity and local area connectivity with one or more external networks (e.g., the Internet 36, private network, etc.), and may selectively communicate with the external network(s) via the respective wide area connectivity and local area connectivity according to the operator's offload policies. These offload policies may be loaded by the core network into the L-GW, such as in a manner via or independent of a UE.

In one example, the connection between the UE 20 and L-GW 48 may be a tunnel, such as a secured tunnel, between the UE and L-GW, which may be originated by the UE. In this example, the tunnel may be established according to any of a number of different techniques to create any one or more of a number of different types of tunnels such as an IP-IP tunnel, IP Security (IPsec) tunnel, Secure Shell (SSH) tunnel, Transport Layer Security (TLS) tunnel, Hypertext Transfer Protocol Secure (HTTPS) tunnel or the like. An IP-IP tunnel may be established, for example, in accordance with Internet Engineering Task Force (IETF) Request for Comments (RFC) document RFC 2003, entitled: *IP Encapsulation within IP*. An IPsec tunnel may be established, for example, in accordance with IETF RFC 4213, entitled: *Basic Transition Mechanisms for IPv6 Hosts and Routers*. A SSH tunnel may be established, for example, in accordance with IETF RFC 4253, entitled: *The Secure Shell (SSH) Transport Layer Protocol*. A SSH tunnel may be established, for example, in accordance with IETF RFC 4253, entitled: *The Secure Shell (SSH) Transport Layer Protocol*. A TLS tunnel may be established, for example, in accordance with IETF RFC 5246, entitled: *The Transport Layer Security (TLS) Protocol*. A HTTPS tunnel may be established, for example, in accordance with IETF RFC 2818, entitled: *HTTP over TLS*.

FIG. 5 is a flowchart illustrating various operations in a method that may be performed by various means of the core network 26, or more particularly for example the MME 28 of the core network, such as by the various means of the apparatus 50 of FIG. 3 configured to operate as a component of the core network, in accordance with example embodiments of the present invention. From the standpoint of the core network, consider instances in which the core network is serving a UE 20 via a wide area RAN 22, and may be additionally providing the UE with connectivity to an external network such as the Internet 36 via an appropriate P-GW 32. In these instances, as shown at block 76, the method may include means such as the processor 52, I/O interface 56 and/or communication interface 58*b* for receiving a request for selection of a L-GW 48. The request may be received, for example, by the core network from the UE via the wide area RAN. As indicated above, in one particular example, the request may be in the form of a message (e.g., LGW_request) requesting the domain name or IP address of a L-GW with which the UE may establish connectivity.

In response to the request, as shown in block 78, the method may include means such as the processor 52 selecting an appropriate L-GW 48. In this regard, the L-GW may be selected in a manner without an impact to the S-GW 30 and/or P-GW 32 of the core network 26 providing connectivity to the UE 20. The L-GW may be selected based on any of a number of different variables including, for example, a subscription of the UE's user with the PLMN operator (determined based on the identity of the UE), the location (e.g., geographical coordinates), context information and/or presence definitions of the UE 20, QoS and/or service profiles, and/or the identity (e.g., SSID) of the local area network 40. More particularly, for example, the means for selecting the L-GW may check a subscription of the UE's user that may involve the MME communicating with a home subscriber server (HSS), home location register (HLR) or the like. The means for selecting the L-GW may also check information regarding the local area network based on its identity, which may involve the contacting or otherwise utilizing a registry of local area networks trusted or contracted with respect to the PLMN. The means for selecting the L-GW may check the UE's location for an appropriate L-GW located proximate the UE. The means for selecting the L-GW may also consider other variables such as its own information regarding selectable L-GWs (e.g., pool areas of gateways) or by searching information bases for information about other selectable L-GWs.

After selecting a L-GW 48, as shown in block 80, the method may include means such as the processor 52, I/O interface 56 and/or communication interface 58*b* for preparing for transmission, and transmitting, a message (e.g., LGW_ response) to the UE 20 (via the wide area RAN 22) including the identity of the selected L-GW. The response message may also, and optionally, include other information such as whether the local area network 40 via which the UE connects to the L-GW is a preferred network (e.g., a trusted or untrusted network), and/or local network security configuration information for the L-GW.

The method may further include means such as the processor 52, I/O interface 56 and/or communication interface 58b for directing the setting up or otherwise loading, into the selected L-GW 48, offload and connectivity policies of the PLMN operator. These policies may be setup or loaded into the selected L-GW before the respective L-GW is selected for the UE 20, or may be setup or loaded during or after the L-GW is selected. In this regard, the offload and connectivity policies may or may not be particular to the UE requesting selection of a L-GW. For example, the offload and connectivity policies may be generic to a UE, and may be loaded into the L-GW before its selection by request of a particular UE. Once selected by request of a particular UE, as shown in block 82, the method may further include means such as the processor 52, I/O interface 56 and/or communication interface 58b for directing updating of the offload and connectivity policies such that one or more of the policies are directed to the particular UE. These policies may be loaded from and/or updated by the core network 26 through an external network such as the Internet 36, or through the wide area RAN 22 and local area network 40 via the UE. By permitting the core network to setup the offload and connectivity policies with the L-GW, the core network operator may at least partially control parameters of the UE's connectivity with the L-GW such as with respect to priorities, charging and traffic management on lower layers or traffic management in the form of IP flows.

Reference is now made to FIGS. 6a and 6b, which collectively present a control flow diagram of the network elements of FIG. 2 and various other network elements implementing example embodiments of the present invention. Although FIGS. 6a and 6b may provide some indication of an order of occurrence of operations between the elements, it should be understood that the operations may be performed in a different order in accordance with example embodiments of the present invention.

As shown, the UE 20 may establish a wide area (i.e., via the wide area RAN 22) PDN connectivity with a server 38 through the P-GW 32. As part of this connectivity, the UE may be assigned an IP address and/or domain name in the domain of the P-GW (e.g., MyIP@PDN_GW). Again, although described as establishing connectivity with a server, that other types of connections are possible, such as in the context of peer-to-peer networking, ad-hoc networking or the like where the UE may serve as a host, client or both host and client.

Before, after or as the UE 20 establishes PDN connectivity with the server 38, the PLMN operator may set one or more access selection policies in the ANDSF 34, which may be transmitted to the UE such as in or concurrent with a MO for the UE. Similarly, the operator may set one or more offload and connectivity policies, which the MME 28 (or other core network component) may transmit to the L-GW 48 for loading thereinto. The L-GW may load or otherwise store the offload and connectivity policies, and return a confirmation back to the MME.

Before, after or as the UE 38 establishes wide area PDN connectivity with the server 38, the UE may scan one or more local area networks 40, or more particularly for example, HeNBs 42 of local area networks. In this regard, the UE may receive beacon signals from one or more HeNBs including the SSIDs of their respective local area networks. The UE may detect the HeNBs and their respective network names and select a local area network including an HeNB with which to connect. The UE may then establish a connection, such as a radio resource control (RRC) connection, with a selected HeNB of the selected local area network.

Once connected with the selected HeNB 42, the UE may establish a DHCP connection with a DHCP server of the selected local area network 40. By this connection, the DHCP server may auto-configure the UE with one or more parameters to permit the UE to communicate in the local area network. These parameters may include, for example, assignment of a dGW 44 and a private IP address to the UE (e.g., IP_UE_dGW=192.168.255.3) at the assigned dGW. At this time, the UE may also be assigned or otherwise configured with a domain name (e.g., MyIP@dGW) associated with its private IP address at the dGW. The UE may then establish an IP connection with its assigned dGW, which may assign a temporary public IP address to the UE (e.g., 17.16.15.4).

After selecting a local area network 40, and before, as or after establishing a connection with the respective local area network, the UE 20 may transmit a request to the MME 28 of the operator's core network for selection of a L-GW 48. The request may be transmitted via the wide area connectivity in the form of a NAS message (e.g., LGW_request) requesting the domain name or IP address of a L-GW with which the UE may establish connectivity. The MME may receive the request, and may select an appropriate L-GW in response to the request. The MME may then transmit a response to the UE that indicates the domain name or IP address of the selected L-GW, such as in the form of a NAS message (e.g., LGW_response). Similar to the request, the response may be transmitted to the UE via its wide area connectivity.

After the UE 20 receives the identity of a selected L-GW 48, presuming the identity is in the form of a domain name, the UE may query a DNS server to acquire the IP address of the L-GW (e.g., 100.3.4.5). The UE may then establish a connection with the respective L-GW based on its IP address. This connection may be established as a tunnel between the UE and L-GW, and its establishment may include tunnelling, authentication and security processes. During establishment of the connection between the UE and L-GW, the UE may be assigned a private IP address (e.g., IP_UE_L-GW=10.10.11.5) at the L-GW. The private IP address may be for, example, an IPSec, SSH, TLS address or the like. At this time, the UE may also be assigned or otherwise configured with a domain name (e.g., MyIP@L-GW) associated with its private IP address at the L-GW.

Upon establishment of its connection with the selected L-GW 48, the UE 20 may have concurrent wide area connectivity and local area connectivity with the server 38. The UE may therefore implement the operator-set offload policies to select between its interfaces to manage its connectivity with the server, such as based on the respective policies loaded into the L-GW by the MME 28. The UE may, for example, perform this interface selection statically per flow or flow type at the client-server connection setup, or per flow or flow type dynamically during the lifetime of a flow based on appropriate criteria. As shown, the UE's local area connectivity with the server may include encapsulating data to/from the UE. The data may include the private IP address of the UE with the L-GW as its inner address, and the private IP address of the UE with the dGW 44 as its outer address.

As explained above, a UE 20 may request selection of a L-GW 48 by a core network 26 with which the UE has an established wide area connection, and the core network may select an appropriate L-GW and provide the identity of the selected L-GW to the UE. In another example embodiment, the UE may instead receive from the core network a list identifying possible L-GWs and instructions on how to select a L-GW from the list.

The core network 26 (e.g., MME 28) may push the list and instructions to the UE 20 at one or more instances, such as when the UE first connects to the core network via the wide area RAN 22. The list and/or instructions may then be periodically updated by the core network, as desired. The list may identify a plurality of possible L-GWs 48, but may alternatively identify a single L-GW such as in the case of a UE roaming abroad. In instances in which the list includes a plurality of possible L-GWs, the instructions may direct the UE to select a L-GW in a number of different manners, such as in a manner similar to that described above whereby the core network selects a L-GW. Thus, for example, the instructions may direct the UE to select a L-GW based on a subscription of the UE's user with the PLMN operator (determined based on the identity of the UE), the location (e.g., geographical coordinates), context information and/or presence definitions of the UE, QoS and/or service profiles, and/or the identity (e.g., SSID) of the local area network 40.

After receiving the list and instructions, the UE 20 may select a L-GW 48 from the list in accordance with the instructions. The UE may then contact and establish a connection with the selected L-GW. In various instances, before contacting and establishing a connection with the selected L-GW, the UE may send a request to the core network 26 (e.g.; MME 28) for approval of the selected L-GW. The core network, in turn, may perform an approval process for the selected L-GW, such as in a manner similar to which the core network selects a L-GW. The core network may then respond to the request accepting the L-GW selection, or otherwise rejecting the L-GW selection.

As also explained above, according to example embodiments of the present invention, a UE 20 may have concurrent radio access connections with both the wide area RAN 22 and local area network 40. The UE's connectivity via the local area network may include a tunnel between the UE and L-GW 48, as opposed to between the HeNB 42 and L-GW. Also, through the concurrent radio access connections, the UE may have different radio access to the same external network or different external networks (e.g., Internet 36), which may be effectuated through the same or different wide area RAN and local area network access point names (APNs). And by permitting multiple concurrent radio access connections, connectivity of the UE may be more robust and less varying in terms of offered throughput.

Further, according to example embodiments, selection of a L-GW 48 may be made in a manner consistent with selection of a S-GW 30, and may be made by the MME 28 without requiring significant resources. The selection process may be effectuated without handover measurement reporting to the core network 26, and/or without executing path (tunnel) switching due to handovers. Local area network handovers and cell changes may be made without visibility to the core network, and connectivity to the local area network may be fully compliant to the IP legacy.

According to one aspect of the example embodiments of present invention, the functions performed by the apparatus 50, such as those illustrated by FIGS. 4-6, may be performed by various means. It will be understood that each block or operation of the flowcharts and control flow diagram, and/or combinations of blocks or operations in the flowcharts and control flow diagram, can be implemented by various means. Means for implementing the blocks or operations of the flowcharts and control flow diagram, combinations of the blocks or operations in the flowcharts and control flow diagram, or other functionality of example embodiments of the present invention described herein may include hardware, and/or a computer program product including a computer-readable storage medium having one or more computer program code instructions, program instructions, or executable computer-readable program code instructions stored therein. In this regard, program code instructions may be stored on a memory device, such as the memory device 54 of the example apparatus, and executed by a processor, such as the processor 52 of the example apparatus. As will be appreciated, any such program code instructions may be loaded onto a computer or other programmable apparatus (e.g., processor, memory device, or the like) from a computer-readable storage medium to produce a particular machine, such that the particular machine becomes a means for implementing the functions specified in the flowcharts' and control flow diagram's block(s) or operation(s). These program code instructions may also be stored in a computer-readable storage medium that can direct a computer, a processor, or other programmable apparatus to function in a particular manner to thereby generate a particular machine or particular article of manufacture. The instructions stored in the computer-readable storage medium may produce an article of manufacture, where the article of manufacture becomes a means for implementing the functions specified in the flowcharts' and control flow diagram's block(s) or operation(s). The program code instructions may be retrieved from a computer-readable storage medium and loaded into a computer, processor, or other programmable apparatus to configure the computer, processor, or other programmable apparatus to execute operations to be performed on or by the computer, processor, or other programmable apparatus. Retrieval, loading, and execution of the program code instructions may be performed sequentially such that one instruction is retrieved, loaded, and executed at a time. In some example embodiments, retrieval, loading and/or execution may be performed in parallel such that multiple instructions are retrieved, loaded, and/or executed together. Execution of the program code instructions may produce a computer-implemented process such that the instructions executed by the computer, processor, or other programmable apparatus provide operations for implementing the functions specified in the flowcharts' and control flow diagram's block(s) or operation(s).

Accordingly, execution of instructions associated with the blocks or operations of the flowcharts and control flow diagram by a processor, or storage of instructions associated with the blocks or operations of the flowcharts and control flow diagram in a computer-readable storage medium, supports combinations of operations for performing the specified functions. It will also be understood that one or more blocks or operations of the flowcharts and control flow diagram, and combinations of blocks or operations in the flowcharts and control flow diagram, may be implemented by special purpose hardware-based computer systems and/or processors which perform the specified functions, or combinations of special purpose hardware and program code instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

What is claimed is:

1. An apparatus comprising:
at least one processor; and
at least one memory including computer program code,
the at least one memory and the computer program code configured to, with the at least one processor, cause the apparatus to at least:
direct establishment of a connection of the apparatus with a core network via a wide area radio access network, the core network being coupled to a first external network;
select or receive selection of a local area network that is distinct from the wide area radio access network, and that is coupled to a second external network via one or more local gateways, the second external network being the same as or different from the first external network;
receive an identity of a selected local gateway from the core network by receiving from the core network a list identifying one or more possible local gateways and instructions on how to select a local gateway from the list; selecting a local gateway from the list in accordance with the instructions; preparing for transmission from the apparatus to the core network via the wide area radio access network, a request for approval of the selected local gateway and in response to the request; and receiving a response from the core network accepting or rejecting the selected local gateway; and
direct contact with the selected local gateway based on the identity, and establishment of a connection of the apparatus with the selected local gateway, the apparatus thereby being connected to the second external network via the local area network and selected local gateway.

2. The apparatus of claim 1, wherein being configured to cause the apparatus to receive an identity of a selected local gateway includes being configured to cause the apparatus to:
prepare for transmission from the apparatus to the core network via the wide area radio access network, a request for selection of a local gateway of the one or more local gateways via which the local area network is coupled to the second external network; and
receive an identity of a selected local gateway of the one or more local gateways from the core network in response to the request.

3. The apparatus of claim 1, wherein being configured to cause the apparatus to direct establishment of a connection of the apparatus with the selected local gateway includes being configured to cause the apparatus to direct establishment of a tunnel between the apparatus and the selected local gateway, the apparatus and selected local gateway being the endpoints of the tunnel.

4. The apparatus of claim 1, wherein the apparatus has a concurrent connection with the first external network via the wide area radio access network and with the second external network via the local area network after establishment of the connection of the apparatus with the selected local gateway.

5. The apparatus of claim 4, wherein the at least one memory and the computer program code are further configured to, with the at least one processor, cause the apparatus to further:
selectively communicate with the first external network via the wide area radio access network, and the second external network via the local area network, according to one or more offload policies loaded by the core network into the selected local gateway.

6. An apparatus comprising:
at least one processor; and
at least one memory including computer program code,
the at least one memory and the computer program code configured to, with the at least one processor, cause the apparatus to at least:
prepare an identity of a selected local gateway for transmission to user equipment, the identity of the selected local gateway being prepared for transmission from the apparatus as part of a core network with which the user equipment is connected via a wide area radio access network, the core network being coupled to a first external network, the user equipment being configured to select or receive selection of a local area network that is distinct from the wide area radio access network, and that is coupled to a second external network via one or more local gateways, the second external network being the same as or different from the first external network, wherein being configured to cause the apparatus to prepare an identity of a selected local gateway for transmission includes being configured to cause the apparatus to prepare for transmission, a list identifying one or more possible local gateways and instructions on how to select a local gateway from the list, the user equipment being configured to select a local gateway from the list in accordance with the instructions;
receive from the user equipment via the wide area radio access network, a request for approval of the selected local gateway; and in response to the request; and
prepare a response for transmission to the user equipment accepting or rejecting the selected local gateway,
wherein the user equipment is configured to contact the selected local gateway based on the identity, and establish a connection with the selected local gateway, the user equipment thereby being connected to the second external network via the local area network and selected local gateway.

7. The apparatus of claim 6, wherein the at least one memory and the computer program code are further configured to, with the at least one processor, cause the apparatus to further:
prepare one or more offload and connectivity policies for transmission from the core network to at least one of the one or more local gateways to thereby load the respective policies into the respective at least one of the one or more local gateways, the user equipment connection with the selected gateway being effectuated in accordance with the offload and connectivity policies.

8. The apparatus of claim 6, wherein the at least one memory and the computer program code are further configured to, with the at least one processor, cause the apparatus to further:
receive a request for selection of a local gateway of the one or more local gateways via which the local area network is coupled to the second external network; and
select a local gateway of the one or more local gateways,
wherein being configured to cause the apparatus to prepare an identity of a selected local gateway for transmission includes being configured to cause the apparatus to prepare an identity of the selected local gateway for transmission.

9. The apparatus of claim 8, wherein being configured to cause the apparatus to select a local gateway includes being configured to cause the apparatus to select a local gateway based on one or more of an identity of the user equipment, a location of the user equipment or an identity of the selected local area network.

10. A method comprising:
directing establishment of a connection of an apparatus with a core network via a wide area radio access network, the core network being coupled to a first external network;
selecting or receiving selection of a local area network that is distinct from the wide area radio access network, and that is coupled to a second external network via one or more local gateways, the second external network being the same as or different from the first external network;
receiving an identity of a selected local gateway from the core network by receiving from the core network a list identifying one or more possible local gateways and instructions on how to select a local gateway from the list; selecting a local gateway from the list in accordance with the instructions; preparing for transmission from the apparatus to the core network via the wide area radio access network, a request for approval of the selected local gateway; and in response to the request receiving a response from the core network accepting or rejecting the selected local gateway; and
directing contact with the selected local gateway based on the identity, and establishment of a connection of the apparatus with the selected local gateway, the apparatus thereby being connected to the second external network via the local area network and selected local gateway.

11. The method of claim 10, wherein receiving an identity of a selected local gateway includes:
preparing for transmission from the apparatus to the core network via the wide area radio access network, a request for selection of a local gateway of the one or more local gateways via which the local area network is coupled to the second external network; and
receiving an identity of a selected local gateway of the one or more local gateways from the core network in response to the request.

12. The method of claim 10, wherein directing establishment of a connection of the apparatus with the selected local gateway includes directing establishment of a tunnel between the apparatus and the selected local gateway, the apparatus and selected local gateway being the endpoints of the tunnel.

13. The method of claim 10, wherein the apparatus has a concurrent connection with the first external network via the wide area radio access network and with the second external network via the local area network after establishment of the connection of the apparatus with the selected local gateway.

14. The method of claim 13 further comprising:
selectively communicating with the first external network via the wide area radio access network, and with the second external network via the local area network, according to one or more offload policies loaded by the core network into the selected gateway.

15. A method comprising:
preparing an identity of a selected local gateway for transmission to user equipment, the identity of the selected local gateway being prepared for transmission from an apparatus of a core network with which a user equipment is connected via a wide area radio access network, the core network being coupled to a first external network, the user equipment being configured to select or receive selection of a local area network that is distinct from the wide area radio access network, and that is coupled to a second external network via one or more local gateways, the second external network being the same as or different from the first external network, the request being for selection of a local gateway of the one or more local gateways, wherein preparing an identity of a selected local gateway for transmission includes preparing for transmission, a list identifying one or more possible local gateways and instructions on how to select a local gateway from the list, the user equipment being configured to select a local gateway from the list in accordance with the instructions;
receiving from the user equipment via the wide area radio access network, a request for approval of the selected local gateway; and in response to the request; and
preparing a response for transmission to the user equipment accepting or rejecting the selected local gateway,
wherein the user equipment is configured to contact the selected local gateway based on the identity, and establish a connection with the selected local gateway, the user equipment thereby being connected to the second external network via the local area network and selected local gateway.

16. The method of claim 15 further comprising:
preparing one or more offload and connectivity policies for transmission from the core network to at least one of the one or more local gateways to thereby load the respective policies into the respective at least one of the one or more local gateways, the user equipment connection with the selected gateway being effectuated in accordance with the offload and connectivity policies.

17. The apparatus of claim 15 further comprising:
receiving a request for selection of a local gateway of the one or more local gateways via which the local area network is coupled to the second external network; and
selecting a local gateway of the one or more local gateways,
wherein preparing an identity of a selected local gateway for transmission includes preparing an identity of the selected local gateway for transmission.

18. The method of claim 17, wherein selecting a local gateway includes selecting a local gateway based on one or more of an identity of the user equipment, a location of the user equipment or an identity of the selected local area network.

19. A non-transitory computer-readable storage medium having computer-readable program code portions stored therein, the computer-readable storage medium and computer-readable program code portions being configured to, with at least one processor, cause an apparatus to at least:
direct establishment of a connection of the apparatus with a core network via a wide area radio access network, the core network being coupled to a first external network;
select or receive selection of a local area network that is distinct from the wide area radio access network, and that is coupled to a second external network via one or more local gateways, the second external network being the same as or different from the first external network;
receive an identity of a selected local gateway from the core network by receiving from the core network a list identifying one or more possible local gateways and instructions on how to select a local gateway from the list; selecting a local gateway from the list in accordance with the instructions; preparing for transmission from the apparatus to the core network via the wide area radio access network, a request for approval of the selected local gateway; and in response to the request; and receiving a response from the core network accepting or rejecting the selected local gateway; and
direct contact with the selected local gateway based on the identity, and establishment of a connection of the apparatus with the selected local gateway, the apparatus thereby being connected to the second external network via the local area network and selected local gateway.

20. The non-transitory computer-readable storage medium of claim 19, wherein being configured to cause the apparatus to receive an identity of a selected local gateway includes being configured to cause the apparatus to:
prepare for transmission from the apparatus to the core network via the wide area radio access network, a request for selection of a local gateway of the one or more local gateways via which the local area network is coupled to the second external network; and
receive an identity of a selected local gateway of the one or more local gateways from the core network in response to the request.

21. The non-transitory computer-readable storage medium of claim 19, wherein being configured to cause the apparatus to direct establishment of a connection of the apparatus with the selected local gateway includes being configured to cause the apparatus to direct establishment of a tunnel between the apparatus and the selected local gateway, the apparatus and selected local gateway being the endpoints of the tunnel.

22. The non-transitory computer-readable storage medium of claim 19, wherein the apparatus has a concurrent connection with the first external network via the wide area radio access network and with the second external network via the local area network after establishment of the connection of the apparatus with the selected local gateway.

23. The non-transitory computer-readable storage medium of claim 22, the computer-readable storage medium and computer-readable program code portions are further configured to, with the at least one processor, cause the apparatus to further:
selectively communicate with the first external network via the wide area radio access network, and the second external network via the local area network, according to one or more offload policies loaded by the core network into the selected local gateway.

24. A non-transitory computer-readable storage medium having computer-readable program code portions stored therein, the computer-readable storage medium and computer-readable program code portions being configured to, with at least one processor, cause an apparatus to at least:
prepare an identity of a selected local gateway for transmission to user equipment, the identity of the selected local gateway being prepared for transmission from the apparatus as part of a core network with which the user equipment is connected via a wide area radio access network, the core network being coupled to a first external network, the user equipment being configured to select or receive selection of a local area network that is distinct from the wide area radio access network, and that is coupled to a second external network via one or more local gateways, the second external network being the same as or different from the first external network, wherein being configured to cause the apparatus to prepare an identity of a selected local gateway for transmission includes being configured to cause the apparatus to prepare for transmission, a list identifying one or more possible local gateways and instructions on how to select a local gateway from the list, the user equipment being configured to select a local gateway from the list in accordance with the instructions;
receive from the user equipment via the wide area radio access network, a request for approval of the selected local gateway; and in response to the request; and
prepare a response for transmission to the user equipment accepting or rejecting the selected local gateway,
wherein the user equipment is configured to contact the selected local gateway based on the identity, and establish a connection with the selected local gateway, the user equipment thereby being connected to the second external network via the local area network and selected local gateway.

25. The non-transitory computer-readable storage medium of claim 24, wherein the computer-readable storage medium and computer-readable program code portions are further configured to, with the at least one processor, cause the apparatus to further:
prepare one or more offload and connectivity policies for transmission from the core network to at least one of the one or more local gateways to thereby load the respective policies into the respective at least one of the one or more local gateways, the user equipment connection with the selected gateway being effectuated in accordance with the offload and connectivity policies.

26. The non-transitory computer-readable storage medium of claim 24, wherein the computer-readable storage medium and computer-readable program code portions are further configured to, with the at least one processor, cause the apparatus to further:
receive a request for selection of a local gateway of the one or more local gateways via which the local area network is coupled to the second external network; and
select a local gateway of the one or more local gateways, wherein being configured to cause the apparatus to prepare an identity of a selected local gateway for transmission includes being configured to cause the apparatus to prepare an identity of the selected local gateway for transmission.

27. The non-transitory computer-readable storage medium of claim 26, wherein being configured to cause the apparatus to select a local gateway includes being configured to cause the apparatus to select a local gateway based on one or more of an identity of the user equipment, a location of the user equipment or an identity of the selected local area network.

\* \* \* \* \*